INVENTORS
Hans Hauk
Rolf Streeck
Helmut Bayer
Luitfried Belik
Curtis, Morris & Safford
ATTORNEYS March 14, 1961 H. HAUK ET AL 2,974,419
METHOD OF AND APPARATUS FOR DRYING SOLID PARTICLES
Filed March 19, 1957 3 Sheets-Sheet 2

INVENTORS
Hans Hauk
Rolf Streeck
Helmut Bayer
Luitfried Belik
BY Curtis, Morris & Safford
ATTORNEYS March 14, 1961 H. HAUK ET AL 2,974,419
METHOD OF AND APPARATUS FOR DRYING SOLID PARTICLES
Filed March 19, 1957 3 Sheets-Sheet 3

INVENTORS
Hans Hauk
Rolf Streeck
Helmut Bayer
Luitfried Belik

BY Curtis, Morris & Safford
ATTORNEYS

ID
2,974,419

METHOD OF AND APPARATUS FOR DRYING SOLID PARTICLES

Hans Hauk, Rolf Streeck, Helmut Bayer, and Luitfried Belik, all of Frankfurt am Main, Germany, assignors to Farbwerk Hoechst Aktiengesellschaft vormals Meister Lucius & Brüning, Frankfurt am Main, Germany, a corporation of Germany Filed Mar. 19, 1957, Ser. No. 647,160

Claims priority, application Germany Mar. 24, 1956

6 Claims. (Cl. 34—10)

The object of the invention is a method of drying solid particles by bringing into contact gases and/or vapors with a layer consisting of solid particles as well as an apparatus for carrying through the invention.

It is known in the art to bring into contact gases or vapors with solid substances capable of being fluidized in order to dry the solids. In this operation, the material to be dried is fluidized with the aid of heated dry air and kept in this state during the entire drying process.

When applying these known methods, it is endeavored to keep the fluidized layer free from channels. In many cases, however, this does not succeed so that irregular heating and overheating of the material to be dried occur, which is disadvantageous.

It has already been tried to carry out the fluidization method such that the formation of channels is avoided or interrupted by employing agitators and installations similar to mixing baffles. These measures, however, often do not come up to expectation. If, for example, the fluidized solid lacks fastness to abrasion, the solid is easily pulverized to an inadmissibly small grain size; if the solid tends to stick or felt, the installations stick together or the layer felts. In many cases, when sticky solids or goods that are sensitive to abrasion are to be dried, the known fluidization methods cannot be applied.

Now we have found a method for the drying of solid particles by bringing into contact gases and/or vapors with a layer composed of solid particles which method avoids the disadvantages described. According to the method of the invention, the gases and/or vapors are introduced into the lower part of the layer composed of solid particles in a periodically interrupted stream whose flow, between two successive interruptions, is sufficient as regards pressure and quantity to swell up the layer of the solid particles up to the point of fluidization, and whose interruptions between two successive flow impulses are sufficient as regards time to deflate the layer to the original height when it had been piled up, or almost to that height.

The solid particles may be of a gritty, granular, powdery or crystalline form. Their size is in general between about $1\mu$ and about 5 mm. If necessary, the particle size may also be below that size, or may exceed it. Thus there may in many cases also be used solid particles with a diameter of about 10 mm. As regards their size, the solid particles may substantially be of a uniform composition. The process of this invention may, however, also be used with special advantage for drying non-uniform solid particles.

The sides and the lower part of the layer of the solid particles should suitably be confined by walls.

As gases all gases may be used that do not detrimentally affect the product to be dried, such as, for example, air or nitrogen. As vapor, there may, for example, be used superheated steam.

There may also be used mixtures of gases and vapors, such as, for example, air/water vapor mixtures. The choice of the gass and/or vapor depends on the demands made on the drying process with regard to the material to be dried and the vapor pressure of the liquid to be removed from the material.

The most economical dry gas is air. When products which are sensitive to oxygen are to be dried, an inert gas is used, such as nitrogen. In this case, the gas is conveyed from the drier to a separator, for example a silica gel absorber, in order to separate the inert gas from the moisture. Then it is again sucked up by the blast, heated and introduced into the drier. There may also be used waste gases from heating plants and gas motors.

Whether there is used a gas or a mixture of gases and vapors for the drying process depends on the special demands made on the particular drying process concerned. Many pharmaceuticals moist with solvents become odorless much quicker if, for example, the drying air contains water vapor.

The method of the invention can be carried out at drying temperatures varying within wide limits. There may, for example, be applied temperatures up to about 800° C. On account of the higher vapor pressure of the liquid to be separated, drying can be effected more quickly at high temperatures than at low temperatures. The temperature at which the material is dried in a particular case depends on the sensitiveness to heat of the product and also on the technical conditions, i.e. whether, for example, vapor of 130° C. is available with which the air is heated, or whether waste gases of several hundred centigrade degrees are to be used for the drying process. If products are to be dried which are very sensitive to heat, the method of the invention can also be effected within a temperature range of 0–30° C. and even at temperatures below 0° C.

The mehod of the invention can be carried out under normal pressure. In many cases, however, it is also possible to use higher pressures, for example pressures of about 10 atmospheres' gage.

A special advantage of the method of the invention lies in the fact that there is obtained a satisfactory and uniform drying of the soid particles on account of the intimate contact realized between the solid particles and gases and/or vapors. There may, in particular, also be dried substances which are especially sensitive to abrasion.

The rate at which the gases and/or vapors flow round the solid particles lies in general between about 0.3 and about 5 m./second. In some cases it is also possible to increase the rate over and beyond the aforementioned value of 5 m./second.

The rate to be applied in individual cases essentially depends on the physical particularities of the solid particles to be dried, for example on their size, their shape (needles or balls) and on their stickiness.

When applying the method of the invention in practice, there do not occur agglutination, felting and pulverization of the solid particles in spite of the high velocities so that the advantages of the known fluidization methods are preserved. By correspondingly regulating the impulses of flow and the intervals, there may also be avoided the discharge of the portion of the most finely pulverized material which cannot be avoided when employing the known fluidization methods. This regulation likewise depends on the physical particularities of the solid particles.

The gases and/or vapors supplied between the intervals are dosed such that the solid material is swelled up almost to the fluidization point. This dosing operation can be carried out by anyone skilled in the art. It is advantageous, in this respect, to carry out the operation such that the amounts of gas and/or vapor introduced into the layer are at least almost constant during the period of applying one impulse of flow.

When applying the method of the invention, the stream of the gases and/or vapors may, after each interval, also change the place or places of entry. When operating in such a manner and applying in combination therewith the intermittent flow, there is avoided with certainty the formation of channels also in those cases when particularly difficult solid materials are to be dried.

Moreover, the method can be adapted to all particularities of the solid particles by varying the period of the impulses of flow or by varying the length of intervals; this possibility of varying the method is of special advantage on account of the fact that the properties of the solid particles, depending on the kind of the material, possibly undergo a substantial change during the drying process so that the process must be adapted to the special conditions applying. Thus, in the initial stage of the drying process, there may, for example, be charged larger amounts of gases and/or vapors with shorter intervals than towards the end of the drying operation, during which operation the changes in the quantity and period of flow and the intervals may be controlled in dependence on the properties of the solid layer or the waste gases which undergo a change during the drying process.

When carrying through the method of the invention, the intervals may in general last from about 0.7 second to about 6 minutes, the periods of impulse from about 0.3 second to about 3 seconds. The periods of intervals and impulses essentially depend on the kind of the product to be dried, on the conditions to be complied with during the drying process and on the size of the drier. These data can in each particular case be determined by those skilled in the art.

In general, an excess pressure of impulse of about 300 mm. to about 800 mm. column of mercury is sufficient. When drying highly sticky products which deposit in the apparatus and agglomerate there, an excess pressure of impulse of three atmospheres' gage and more may be necessary in order to break up the agglomerated product.

When drying some substances, especially those which are especially sensitive to abrasion, it is suitable to extend the intervals, i.e. the time between the closing of the one valve and the opening of the other valve, up to several minutes, for example up to about 6 minutes. During these intervals, the gas and/or vapor used for the drying process is blown in via the distributor plate in a distribution which is as uniform as possible.

During this operation, the rate of flow is in general kept slow, suitably so slow that the portion of the most finely pulverized material is not discharged or possibly only to an extent which is practically without significance. This careful drying operation possibly requires a somewhat prolonged drying period, depending in each case on the kind of the solid particles.

In carrying out the process of the invention, various apparatus may be used. An apparatus which is especially suitable is characterized in that it possesses a space for the admission of the solid layer. This chamber has in general a cylindrical form. In some cases, it may, however, also be of a conical shape. The cylindrical form is preferred in those cases where a vertical intermixing of the material is not desired, for example in a continuous drying operation. When drying the material in portions, a vertical intermixing is desired in order to obtain a product which is dried as uniformly as possible. In this case the drier should have a conical shape. For reasons of flow technique it is disadvantageous that the cone angle aperture exceed 20°.

The space for admitting the solid layer is provided with a lower part consisting of annular chambers which may be closed like shutters. The apparatus furthermore has a distribution device for the supply of gases and/or vapors to the lower part of the space containing the solid layer. This distribution device has several connections which—via a corresponding number of supply lines fitted with an appropriate number of interrupter valves—are connected with the chambers at the lower part of the chamber. The interrupter valves are regulated by a control mechanism. There may, for example, be used as control mechanism an electric program controller cylinder which is known in the art. Moreover, the apparatus may be designed so that the space to be charged with the solid layer is provided with a separator connected in series and optionally with a dust-collecting chamber and a filter also connected in series. The apparatus may, furthermore, comprise one or several continuously operating elements for the supply of the solid particles to the space and may also comprise a discharge mechanism at the lower part of the chamber which operates continuously or periodically.

An apparatus suitable for use in carrying out the process of this invention is shown diagrammatically in the accompanying drawings.

Figure 1:
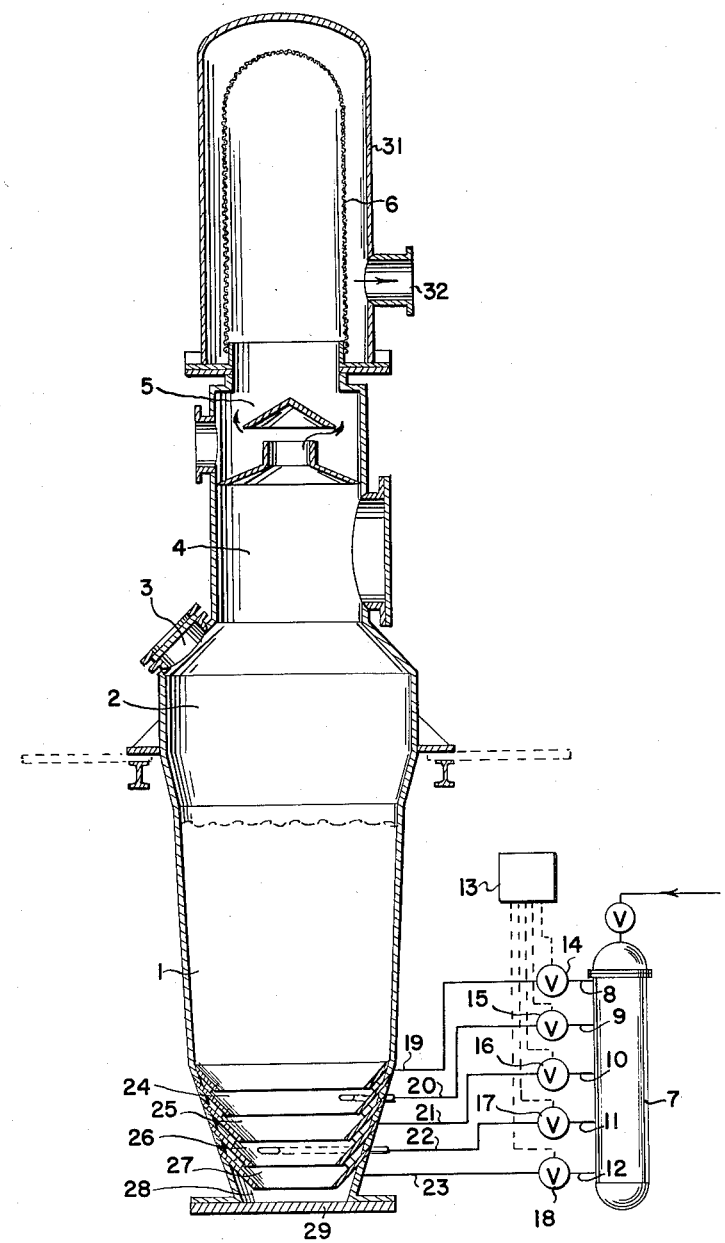
Figure 1 is a front elevation, in section, of an apparatus according to the invention, in which control means have been shown schematically.

The apparatus in Figure 1 comprises a conically shaped space 1 to be charged with the solid layer. In its middle part 2 the apparatus is conically enlarged to form a separator for the coarse material. Part 2 is provided with a short feed pipe 3. The upper part 4 is connected with filter 6 via a dust-collecting chamber 5. The supply of the gases and/or vapors is affected by an element consisting of a distribution device 7 provided with several connection fittings 8, 9, 10, 11, 12, a control mechanism 13, for example an electric program controller cylinder, and interrupter valves 14, 15, 16, 17, 18, for example magnetic valves known in the art. The apparatus is, furthermore, provided with a distribution and discharge bottom connected with the distribution device through supply lines 19, 20, 21, 22, 23. This distribution device is shown in detail in Figs. 3 and 4. The distributor bottom consists of a cone the lower end of which is provided with a discharge opening closed by a locking member 29. The cone consists of conical rings superposed one above the other in a shutter-like manner so that in each case two superposed conical rings form a chamber open at the bottom. In each case, supply lines 19–23 open tangentially into the outer ring of chambers 24–28 so formed. The mouths of supply lines 19–23 are displaced relative to each other at the periphery of the distributor bottom so that the gas inlet openings are distributed over the entire distributor bottom. Due to the construction of the distributor bottom the mouths of supply lines 19–23 are each covered in the distributor bottom by one of the conical rings so that the product cannot penetrate into the supply lines 19–23.

Figure 4:
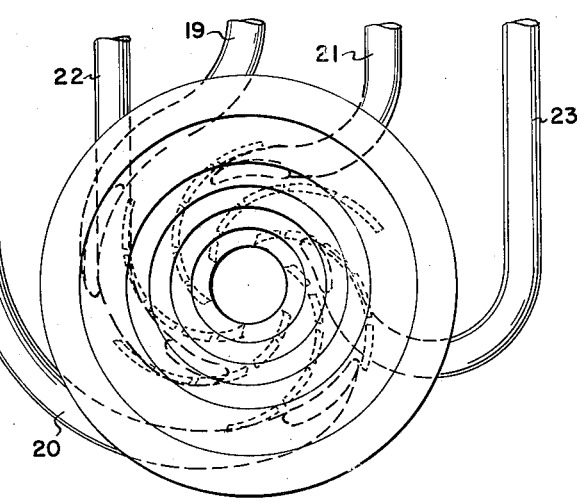
Figure 4 is a plan view of the gas distribution member shown in Figure 3.
Figure 3:
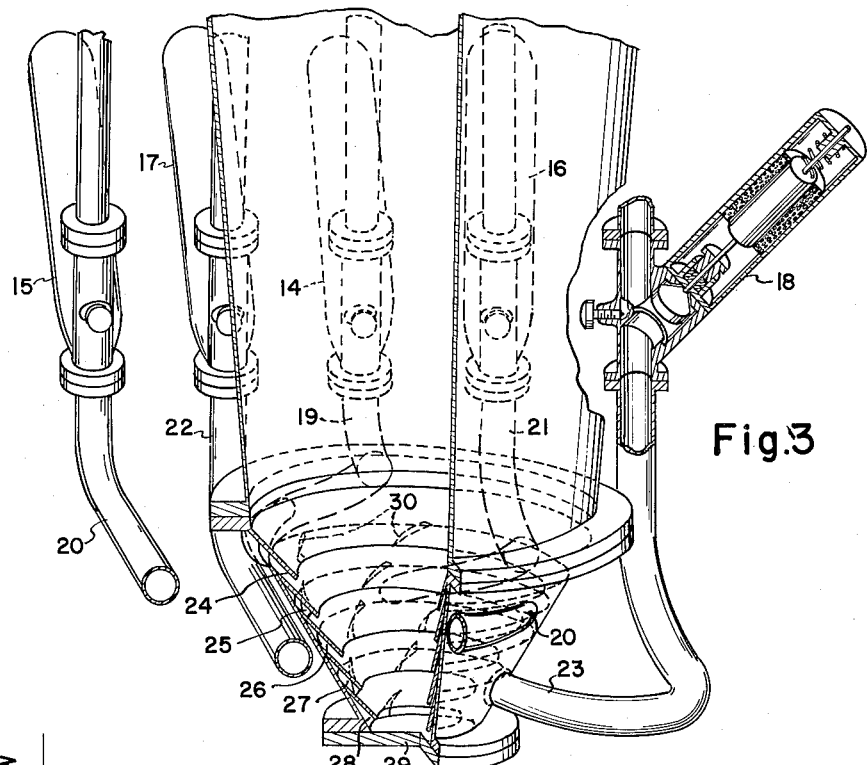
Figure 3 is a perspective view of a gas distribution member, shown as a part of Figure 1, broken away to show internal portions thereof.

The apparatus as illustrated in Fig. 1 may further comprise guide plates 30 (as illustrated in Figs. 3 and 4), which are inserted in the slits between chambers 24, 25, 26, 27, 28, and/or a hood 31 arranged on filter 6 with an exhaust gas pipe 32.

When operating the apparatus, the solid material is introduced via a short feed pipe 3. By means of a conventional control member 13 (controller cylinder, distributor head, etc.) valves 14–18 are automatically and alternately switched on and switched off. Consequently, the gas is alternately supplied from distributor device 7 to the distributor bottom via chambers 24, 25, 26, 27 and 28 superposed one above the other in a shutter-like manner. Thus, the gas is alternately supplied to the distributor bottom at different places. It is advisable to use a control member which enables the duration of the opening periods and intervals to be so adjusted that the amount of gas supplied during an opening period is just sufficient to inflate the layer of solid particles to the whirling point or to a degree near the whirling point. The length of interval suffices to allow the layer to collapse to the initial height of the layer or to a degree near the initial height of the layer. After having regulated the sequence of opening valves 14–18 and the intervals between the openings, the apparatus is ready for operation.

Figure 6:
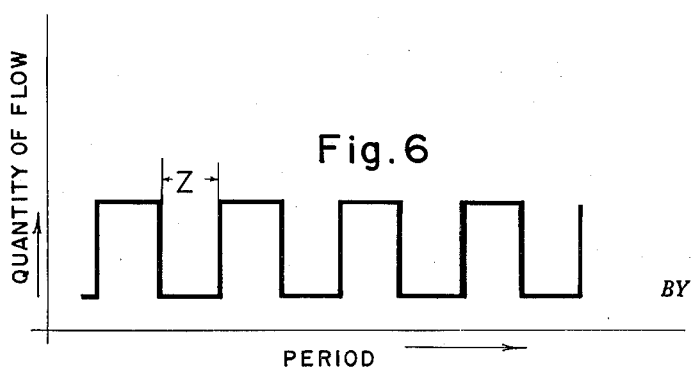

During operation, the regulation of the periods of opening, the intervals and the quantities of flow can be controlled, for example, through an inspection glass. The regulation of control mechanism 13 can at any time be changed during the operation if required, for example owing to a change in the properties of the material. The regulation is accurate if the solid layer is whirled up almost to the point of fluidization by the gases and/or vapors and then, during the flow intervals, deflated completely or almost completely to the original height of layer. When using this regulation the layer performs a breathing movement. Control mechanism 13 may also be regulated so that the flow of the gases and/or vapors between two flow impulses is throttled incompletely. This has the effect that the solid particles swelled up are deflated more slowly or that the deflation is limited to a height which lies between the original height of the layer and the maximum state of swelling. This modification of the process of the invention is most advantageous when sticky material is to be dried. Fig. 6 shows such a modified mode of operation.

Figure 2:
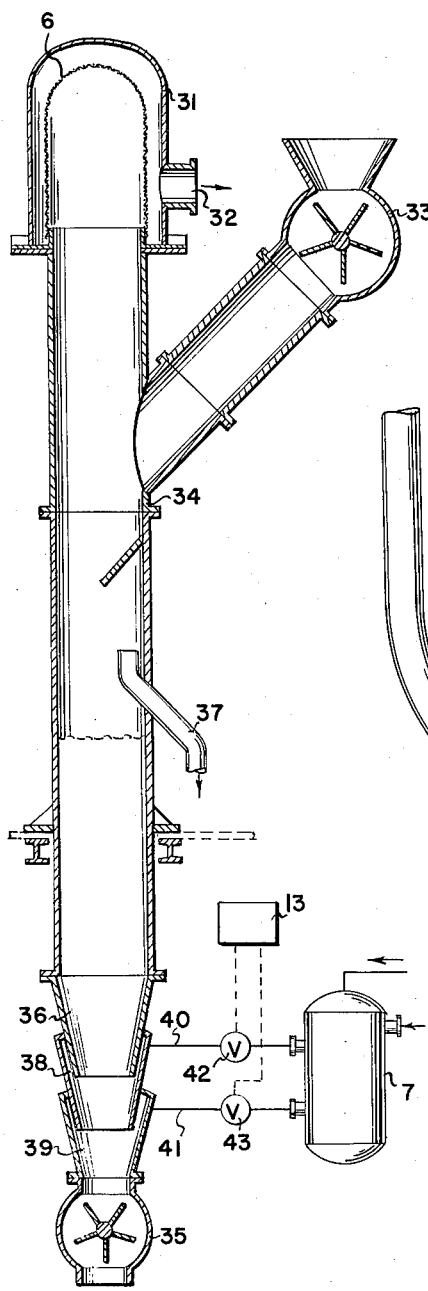
Figure 2 is a front elevation, in section, of another embodiment according to the invention, in which control means have been shown schematically.

Fig. 2 illustrates by way of example another apparatus suitable for use in carrying out the process of the invention. According to this modification, the apparatus is additionally provided with a continuously working inlet and dosing device 33 in the upper part 34 of the apparatus, as well as a continuously or periodically operating discharge device 35 in the lower part 36 of the apparatus. Because of these additional installations the process can be carried out continuously. Discharge device 35 may be used merely for removing the material and the continuous discharge can be effected by overflow pipe 37. This apparatus comprises only two chambers 38 and 39 at the bottom, into which fit supply lines 40 and 41, provided with valves 42 and 43, from distribution device 7.

*Example 1*

Via short feed pipe 3, sodium para-amino-salicylate is introduced into an apparatus as illustrated in Fig. 1, which has a capacity of 60 liters. The material introduced into the apparatus is crystalline and consists up to about 30 percent of solid particles which have a size of about 0.5 mm. to 2 mm. Of the remaining portions of the material, 20 percent have a size of from $50\mu$–$100\mu$, and 50 percent from $100\mu$–$500\mu$. For operation, the dry air blower is provisionally adjusted to a discharge pressure of 400 mm. water column and an air temperature of 40° C. Control organ 13 is likewise provisionally regulated so that the opening period of each of valves 14–18 is 1.5 seconds and 2 seconds for the interval between the opening of each following valve. According to this regulation, the valve remains closed for 16.0 seconds after the opening period of 1.5 seconds; 2 seconds after the closing of the first valve the second valve is opened for 1.5 seconds and then likewise remains closed for 16.0 seconds, etc.

Figure 5:
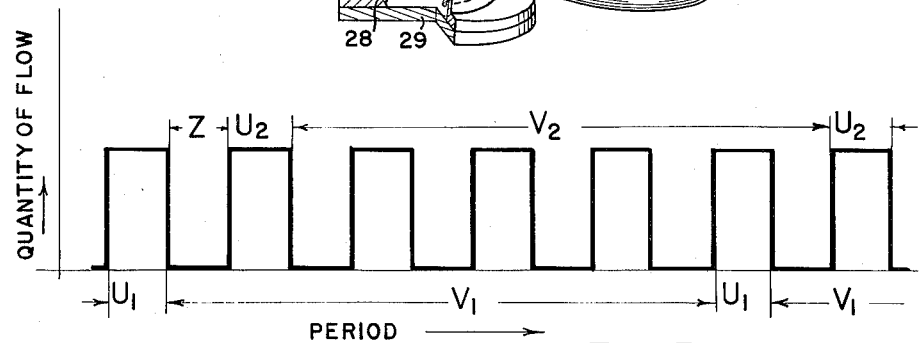
Figures 5 and 6 are graphs of the rate of flow of gas passed through a particle layer according to the invention as a function of time.

Figure 5 diagrammatically illustrates this program control:

$i_1, i_2, i_3, i_4, i_5$=the various valves,
$u_1$ and $u_2$=the periods in which the respective valve is open,
$v_1$ and $v_2$=the periods in which the valve remains closed,
$Z$=the period between the closing of one valve and the opening of the following valve.

The operation commences with these data which have been determined in preceding test series with similar products. After a drying period of about one hour, the periods during which the valves are open are slightly shortened by a corresponding adjustment of the controller cylinder, and after about two hours the drying process is terminated. Including water of crystallization, the material has a water content of about 17 percent; all portions are odorless and almost colorless.

Although, when carrying out control experiments in a drying cabinet, an almost colorless product was obtained after 10 hours' drying with continuous control of the material to be dried, samples taken from the vicinity of the walls or the bottom of the hurdles showed, however, changes in the product by a partial extraction of the water of crystallization.

*Example 2*

Under the same conditions as described in Example 1, acetyl salicylic acid, which has been pretreated in a centrifuge, is dried in an apparatus of the kind described in Example 1. The apparatus has a capacity of about 300 l., the quantity introduced is about 185 kilos and the temperature of the substance is about 45° C. After having been dried for two hours, the product is completely air-dry.

*Example 3*

N-(4-methylbenzene-sulfonyl)-N'-n-butylurea is introduced into an apparatus, as illustrated in Figure 1, which has a capacity of 800 l. The product has a medium grain size of 0.3 mm. and is methanol-moist. The product is introduced into the apparatus in portions of 400 kilos. The process is carried out under essentially the same conditions as described in Example 1; the air blown into the apparatus during this operation has a temperature of 60° C. The temperature of the product to be dried first drops to 10° C. and slowly rises to 30° C. The following data are valid for the regualtion of the drying apparatus:

Intervals _____ 0.8 second.
Period of impulse _____ 0.4 second.
Excess pressure of impulse _____ 500 mm. of mercury column.
Drying period _____ 6 hours.

For purposes of comparison it is indicated that the same product which had been dried in a vacuum drying cabinet for 36 hours was not yet odorless.

*Example 4*

Under essentially the same conditions as described in Example 1, para-toluenesulfonamide is dried in portions of 30 kilos in a drying apparatus as illustrated in Fig. 1. The drying period is from 4–5 hours.

*Example 5*

Sodium phenyl-dimethyl-pyrazolone-methylaminomethane-sulfonate is introduced into a drying apparatus as illustrated in Fig. 1, which has a capacity of 800 l. The product is spirit-moist and composed of crystals in the form of needles 2–3 mm. long and about 0.5 mm. thick. The product is sensitive to heat. It is employed in charges of 300 kilos. The following data are given for adjusting the drying apparatus:

Intervals _____ 0.9 second.
Period of impulse _____ 0.6 second.
Excess pressure of impulse _____ 400 mm. of mercury column.
Drying temperature of the air _____ 110° C.

During the drying process, the temperature of the product first drops from room temperature to 15° C. and then slowly rises to 18–20° C. during a period of 2 hours; during another 60 minutes the temperature rises up to 40° C. After this period, the drying process is terminated at 40° C. since the product is dry.

A product is obtained with a theoretical content of water of crystallization, while no undesirable decomposition phenomena were observed. When, for purposes of comparison, this product is dried in a drying cabinet, it is not possible to obtain a product with a theoretical content of water of crystallization. Moreover, the product dried in a drying cabinet incrusts to a high degree and the screening residue amounts up to 30 percent. Contrary thereto, these disadvantages do not occur when drying the material according to the method of the invention.

Another advantage lies in the fact that the screening period of the product dried according to the method of the invention is appreciably lower as compared with the screening period for the same quantity of the material dried in a drying cabinet in known manner.

For a quantity of 300 kilos of product dried in a drying cabinet, the screening period amounts to 7 hours; for the material dried according to the method of the invention, the screening period only amounts to one hour for the same quantity of material.

*Example 6*

Crystalline procaine of about 1 mm. is introduced in portions of 300 kilos into an apparatus as illustrated in Figure 1, which has a capacity of 800 l. The process is carried out substantially in the same manner as described in Example 1. The following data are valid for adjusting the drier:

Intervals _____ 0.8 second.
Period of impulse _____ 0.4 second.
Excess pressure of impulse _____ 480 mm. of mercury column.
Air temperature _____ 100° C.

The temperature of the material first decreases slightly and then rises slowly, and later on quickly, to 40–45° C. The drying period amounts to 2.5 hours. Compared herewith, the drying period in a vacuum drying cabinet amounts to 11 hours under similar conditions.

*Example 7*

Granulated starch is introduced in portions of 30 kilos into an apparatus as illustrated in Figure 1, which has a capacity of 60 l. The product whose grains have a size of from 3–4 mm. is extremely sensitive to abrasion. The process is carried out in essentially the same manner as described in Example 1. The following data are given for adjusting the drier:

Intervals _____ 6 minutes.
Period of impulse _____ 0.4 second.
Excess pressure of impulse _____ 480 mm. of mercury column.

In the intervals, a fairly strong stream of air is passed through the product. The strength of the stream of air is limited by the fact that the product is not allowed to move. The excess pressure in the top entry of the distributor amounts to 250 mm. of mercury column; this excess pressure is reduced to 15 mm. of mercury column in the course of the drying process since otherwise the granular material commences to "dance." The air temperature is 90° C., the drying period about 9 hours. The abrasion is so small that it can practically be neglected.

*Example 8*

Di-hydroxy-naphthalene is introduced in portions of 30 kilos into an apparatus as illustrated in Fig. 1, which has a capacity of 60 l. The process is carried out in essentially the same manner as described in Example 1. As a dry gas nitrogen is used. The moist nitrogen is passed over a gilled-tube radiator. The moisture condenses on the externally ribbed pipes. The nitrogen is then sucked up by the blast, compressed, heated up to 100° C. by a second gilled-tube radiator and introduced into the drier. The following data are valid for the regulation of the drier:

Intervals _____ 0.8 second.
Period of impulse _____ 0.3 second.
Excess pressure of impulse _____ 400 mm. of mercury column.
Drying period _____ 2½ hours.

When carrying out the process, the product warms up from 20° C. to about 50° C.

There is obtained a reliable product.

We claim:

1. A process for the drying of solid particles by contacting gaseous substances with a layer of said particles, said layer being limited at its sides and bottom, which comprises introducing the gaseous substances into the lower part of said layer in a periodically interrupted stream by substantially instantaneously increasing the flow rate of said gaseous substances into said layer from a minimum flow rate to a maximum flow rate at which said layer of particles becomes inflated to the point of fluidization and the pressure of said gaseous substances is increased by 300 mm. of Hg to 800 mm. of Hg, maintaining said maximum flow rate into said layer for a period between about 0.3 second to about 3 seconds, then substantially instantaneously reducing the flow rate of gaseous substances into said layer to said minimum flow rate at which said layer of particles is deflated to a height substantially that before inflation of said layer, and maintaining said minimum flow rate into said layer for a period between about 0.7 second to about 6 minutes.

2. A process as in claim 1 wherein said periodically interrupted stream of gaseous substances is introduced into said layer of particles, after each interruption, at a different point of injection.

3. An apparatus for drying solid particles by contacting them with gaseous substances, which apparatus comprises, in combination, a drying vessel for containing said particles, said vessel having a lower extremity; a hollow conical gas distribution member having a converging conical wall and depending from said lower extremity of said drying vessel; a plurality of spaced superimposed conical rings within said conical wall and affixed thereto, defining with said wall a plurality of circumferential chambers opening into said hollow gas distribution member; a plurality of gas inlets in said conical wall, each entrant into different of said chambers; a plurality of conduits tangential to said conical wall and communicating with said gas inlets; timing means; a plurality of valves in said conduits responsive to said timing means, said timing means successively opening and closing said valves in sequence to produce periods of maximum and minimum flow of said gaseous substances therethrough, said opening and closing of said valves being substantially instantaneous, whereby said gaseous substances are brought to successively different of said circumferential chambers via successively different conduits; means for exhausting gas from the upper portion of said vessel; and means for withdrawing dried material from said vessel.

4. A process as described in claim 1 for which said minimum value of flow is not zero.

5. An apparatus as described in claim 3 for which said drying vessel is of cylindrical shape.

6. An apparatus as described in claim 3 for which said drying vessel is of conical shape.

References Cited in the file of this patent

UNITED STATES PATENTS

| | | |
|---|---|---|
| 2,750,681 | Berry | June 19, 1956 |
| 2,813,351 | Godel | Nov. 19, 1957 |